Oct. 2, 1928.

H. S. COE

THICKENING APPARATUS

Filed Jan. 9, 1925  3 Sheets-Sheet 1

INVENTOR.
H. S. Coe

BY
ATTORNEY.

Oct. 2, 1928.

H. S. COE 1,686,203

THICKENING APPARATUS

Filed Jan. 9, 1925     3 Sheets-Sheet 2

INVENTOR.
H. S. Coe
BY
ATTORNEY.

Oct. 2, 1928.

H. S. COE 1,686,203

THICKENING APPARATUS

Filed Jan. 9, 1925

3 Sheets-Sheet 3

INVENTOR.
H. S. Coe

BY
ATTORNEY.

Patented Oct. 2, 1928.

1,686,203

UNITED STATES PATENT OFFICE.

HARRISON S. COE, OF LAWRENCE, KANSAS.

THICKENING APPARATUS.

Application filed January 9, 1925. Serial No. 1,476.

This invention relates to apparatus for the separation of suspended solids in liquids by sedimentation, commonly known in the art as "thickeners" and it is an object of the invention to provide an apparatus of the above described character particularly adapted for the treatment of hot solid-liquid suspensions such as the muds and solutions obtained in the process of sugar production.

An essential factor in attaining the above stated object by apparatus constructed in accordance with my invention, is an automatic heat transference which effects and maintains a rapid and clean separation between the clarified and unclarified juices, and still another feature in the operation of the apparatus, which promotes and expedites the settling of solids out of liquid in the material under treatment, resides in the production of convection currents in the material passing to the settling chamber, resulting in intensified flocculation.

Figure 1:
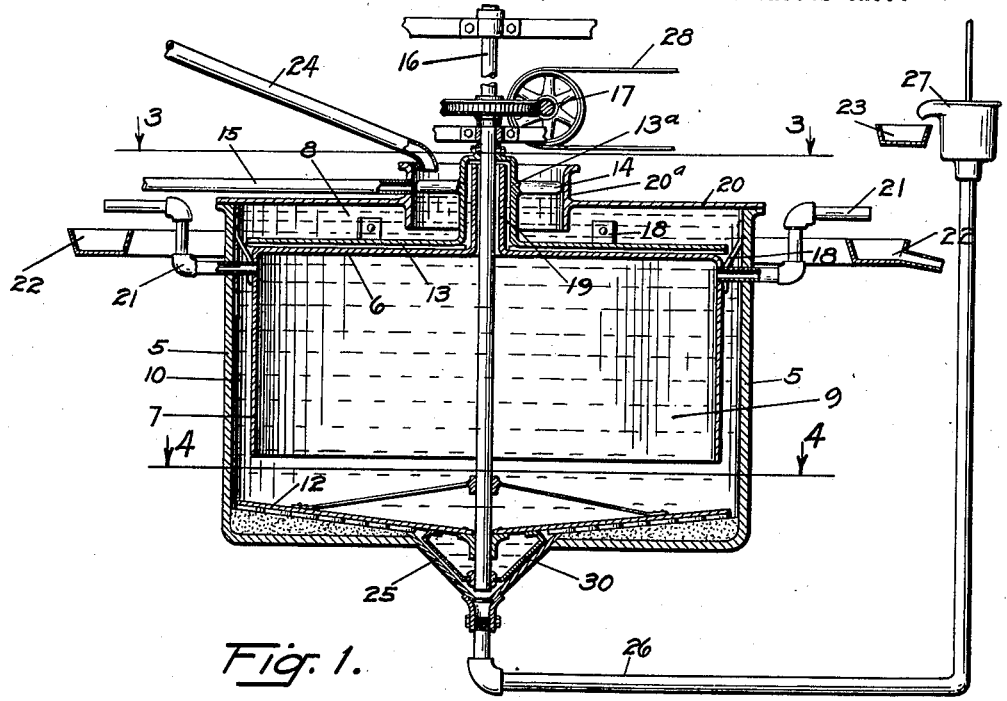
Figure 2:
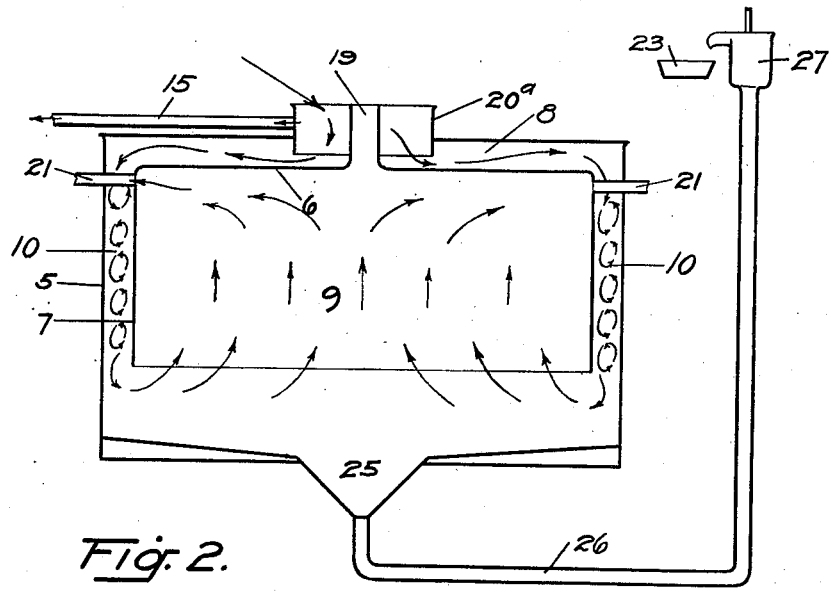
Figure 3:
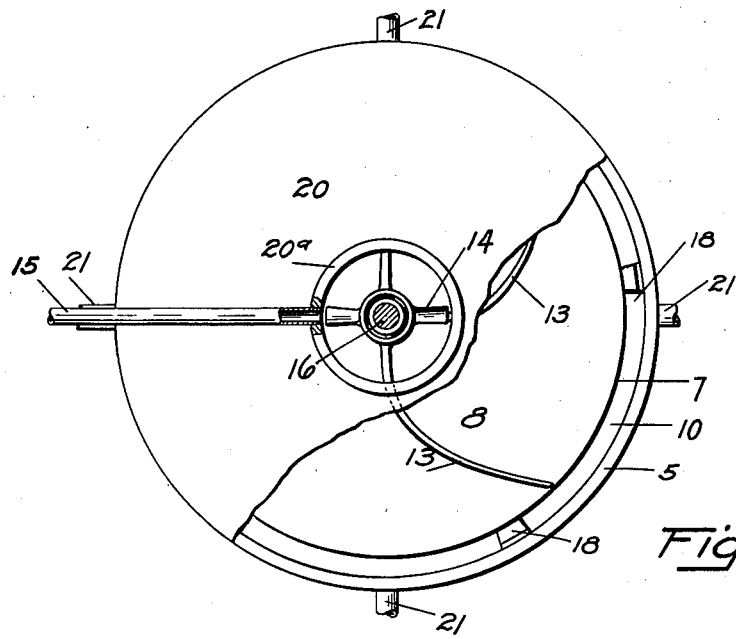
Figure 4:
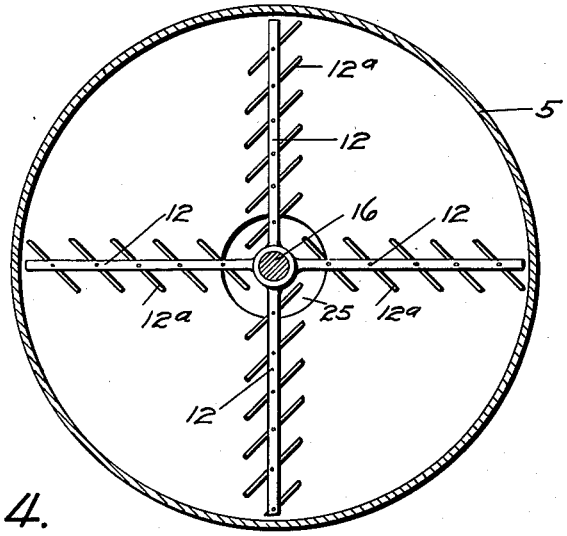
Figure 5:
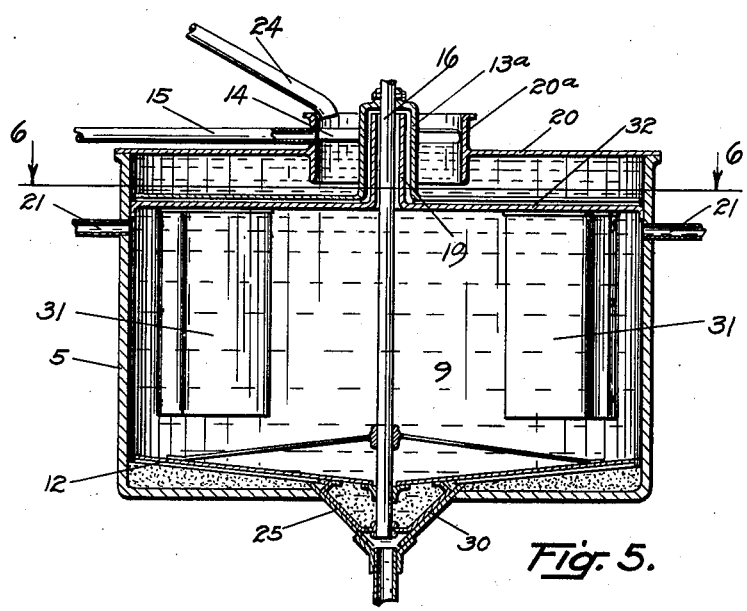
Figure 6:
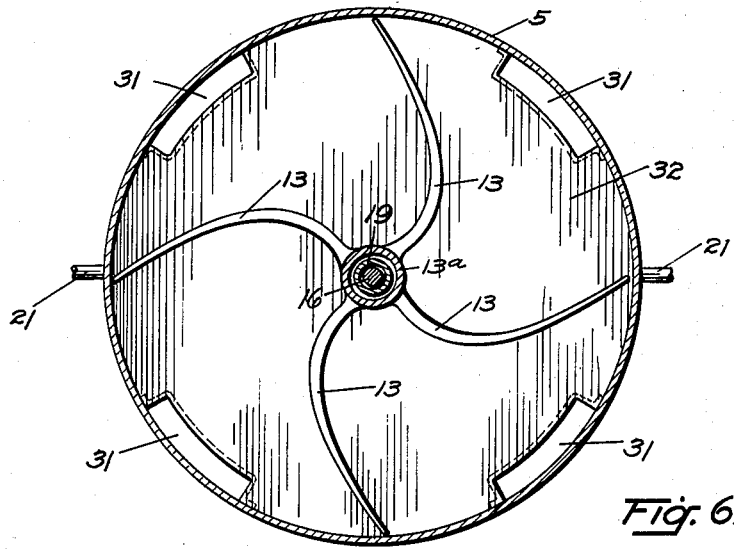

A thickening apparatus in which the above and other features of my invention are embodied has been illustrated in the accompanying drawings in the several views of which like parts are similarly designated and in which Figure 1 represents a sectional elevation of the apparatus;

Figure 2, a diagrammatic view showing the currents produced in the operation of the apparatus;

Figure 3, a sectional and fragmentary plan view in the plane indicated by the line 3—3, Figure 1;

Figure 4, a horizontal section taken on the line 4—4 in Figure 1;

Figure 5, a sectional elevation showing a modified construction of the apparatus; and Figure 6, a horizontal section along the line 6—6, Figure 5.

Referring to the drawings, the reference numeral 5 designates a cylindrical tank or subsidence vessel having in the center of its bottom a funnel-shaped sump 25 for the discharge of settled solids.

A pipe 26 connects the sump with a pump assembly shown at 27, to regulate the removal of the thickened matter from the apparatus.

A horizontal partition 6 below the upper edge of the vessel and a cylindrical partition 7 spaced concentrically from the circumferential wall of the same, divide the interior of the vessel into an upper or feed chamber 8, a lower or settling chamber 9 and an annular passage 10 for the downward flow of material from the one chamber to the other.

An assembly of impelling elements operating on the material under treatment in the vessel comprises an upright shaft 16 coaxial with the tank and supported for rotation in suitably arranged bearings.

A plurality of inclined arms 12 provided with transverse scraper-blades 12$^a$ project radially from the shaft above the bottom surface of the tank to impel the settled and thickened solids toward the central outlet represented by the sump 25, and a series of curved arms 13 extend from the shaft in the feed chamber to move the material fed into the apparatus toward the annular passage 10.

The arms 13 project from a hollow hub 13$^a$ extending above the top of the tank, and skimming rakes or paddles 14 connected to the hub, are provided for the removal of froth from the level of liquid in the feed chamber.

The shaft is rotated by a worm gear 17 which receives its motion from a conveniently located source of energy by means of a belt 28.

The two partitions 6 and 7 are preferably formed integrally in the shape of an inverted vessel which is suspended from the rim of the tank 5 by hangers 18.

A central boot 19 on the horizontal partition 6 extends into the hollow hub above the top of the tank to permit of passing the rotary shaft through the partition without leakage of material between the two chambers above and below the same.

The tank is covered by a lid 20 which has a central boot 20$^a$ spaced from the hub 13$^a$ in coaxial relation thereto to form a zone for the operation of the skimming rakes 14.

A pipe 15 connected with the boot provides for the discharge of foam skimmed from the surface of the liquid by rotation of the rakes and a conduit 24 connected with a conveniently located source of supply, feeds the material to be treated into the zone defined by the boot, whence it passes across the lower edge of the latter into the surrounding portion of the feed chamber. Overflow pipes 21 remove the clarified liquid from the upper portion of the settling chamber to a launder 22.

In the operation of the apparatus, the hot mixture of liquid and solids in suspension is fed through the pipe 24 into the boot 20$^a$ where the foam is removed by the skimmerrakes 14 to the conduit 15 which discharges outside the tank.

The material entering the major portion of the feed chamber across the lower edge of the boot, moves under the impellent influence of the scraper arms 13 outwardly to and downwardly through the annular passage 10 and into the bottom portion of the tank, which forms part of the settling chamber.

The solids settling out of the liquid in the chamber are moved into the central sump 25 by the rotary motion of the scraper arms 12, and they are drawn from the sump through the pipe 26 by the action of the pump 27.

A scraper 30 mounted at the lower end of the shaft 16 inside the sump prevents clogging by accumulation of solids and thereby contributes to maintaining a continuous and substantially uniform discharge of thickened matter from the tank.

The clarified juice is at the same time withdrawn from the upper portion of the settling chamber through the overflow pipes 21 and the volume of matter thus continuously discharged from the subsidence vessel, is replaced by fresh material fed into the tank as hereinbefore described.

The mixture of liquids and solids entering the feed chamber at a comparatively high temperature, impart heat to the clarified juices in the upper portion of the settling chamber by the inherent conductive property of the partitions by which the chamber is defined and as the mixture moves downwardly through the annular passage 10,—it is gradually cooled by loss of heat through the outer wall of the tank and to a lesser extent through the annular partition 7.

It follows that the mixture of solids and liquids enters the settling chamber at the bottom portion of the tank at a reduced temperature and that the clarified and partially clarified juices in the chamber are continually reheated in inverse ratio to the decrease of temperature of the material moving outwardly in the feed chamber and downwardly through the annular passage 10.

The temperature of the material in the settling chamber thus increases in ratio to its depth, being highest at the level of overflow of the clarified liquid from the chamber and lowest where the fresh material enters the same.

Inasmuch as the density of the material is proportionate to its temperature, the mixture of solids and liquids fed into the bottom portion of the settling chamber at a comparatively low temperature will not rise into and mix with the material of lesser density and higher temperature in the higher portions of the same with the result that by a rapid and continuous settling movement of solids in the chamber, the juices removed by overflow from the upper portion of the same, are clear and comparatively free from solid matter.

Another advantageous feature obtained in the operation of the apparatus, resides in the formation of convection currents in the annular passage between the chambers by a systematic rolling and mixing which promotes flocculation and thereby contributes to the rapid and clean clarification of the juices in the settling chamber.

The construction illustrated in Figures 5 and 6 of the drawings differs from that hereinabove described in that the passage between the upper portion of the tank at which the fresh material enters and the bottom portion of the same which constitutes the lower portion of the settling chamber, is represented by a plurality of open-ended flues 31 formed interiorly of the outer wall of the tank in connection with openings of a horizontal partition 32 which adjoins said wall at its circumferential edge.

The principal advantage of this modification is simplicity of construction by elimination of the cylindrical partition, which not only saves in labor and material but also avoids the necessity of passing the overflow conduit through two openings for their connection with the settling chamber.

Having thus described my invention, what I claim and desire to secure by Letters Patent is:

1. An apparatus for separating solids in hot solid-liquid suspensions, comprising a tank, a settling chamber having a circumferential, heat-transferring wall spaced from the corresponding wall of the tank to provide a downwardly extending passage, the settling chamber having an outlet for settled solids and an overflow for clarified liquid, and a feed chamber above the settling chamber separated therefrom by a substantially horizontal partition and connected with the passage for the conveyance of material to the lower portion of the settling chamber.

2. An apparatus for separating solids in hot solid-liquid suspensions, comprising a tank, a settling chamber having a circumferential, heat-transferring wall spaced from the corresponding wall of the tank to provide a downwardly extending passage, the settling chamber having an outlet for settled solids and an overflow for clarified liquid, a feed chamber above the settling chamber separated therefrom by a substantially horizontal partition and connected with the passage for the conveyance of material to the lower portion of the settling chamber, and an impelling member in the feed chamber adapted to move the feed toward the circumferential passage whereby to expedite the heating action.

3. An apparatus for separating solids in hot solid-liquid suspensions, comprising a tank, a settling chamber having a circumferential, heat-transferring wall spaced from the corresponding wall of the tank to provide an annular downwardly extending passage, the settling chamber having an outlet for settled solids and an overflow for clarified liquid, and a feed chamber above the settling chamber separated therefrom by a substantially horizontal partition and connected with the passage for the conveyance of material to the lower portion of the settling chamber.

4. An apparatus for separating solids in hot solid-liquid suspensions, comprising a tank, a settling chamber having a circumferential, heat-transferring wall spaced from the corresponding wall of the tank to provide a downwardly extending passage, the settling chamber having an outlet for settled solids and an overflow for clarified liquid, and a feed chamber above the settling chamber separated therefrom by a substantially horizontal, heat-transferring partition and connected with the passage for the conveyance of material to the lower portion of the settling chamber.

In testimony whereof I have affixed my signature.

HARRISON S. COE.